US008651417B2

(12) United States Patent
Hilliard et al.

(10) Patent No.: US 8,651,417 B2
(45) Date of Patent: Feb. 18, 2014

(54) BOGIE STOP BLOCK (75) Inventors: Matthew Hilliard, Gloucester (GB); Ian Bennett, Cheltenham (GB)

(73) Assignee: Messier-Dowty Limited, Gloucester (GB)

( * ) Notice: Subject to any disclaimer, the term of this patent is extended or adjusted under 35 U.S.C. 154(b) by 75 days.

(21) Appl. No.: 13/503,265

(22) PCT Filed: Apr. 30, 2010

(86) PCT No.: PCT/GB2010/050716
§ 371 (c)(1),
(2), (4) Date: Jun. 8, 2012

(87) PCT Pub. No.: WO2011/048394
PCT Pub. Date: Apr. 28, 2011

(65) Prior Publication Data
US 2012/0256050 A1 Oct. 11, 2012

(30) Foreign Application Priority Data
Oct. 23, 2009 (GB) .................................. 0918607.3

(51) Int. Cl.
*B64C 25/52* (2006.01)
(52) U.S. Cl.
USPC ............... 244/100 R; 244/102 R; 244/102 A; 244/103 R
(58) Field of Classification Search
USPC ................... 244/100 R, 102 R, 102 A, 103 R
See application file for complete search history.

(56) References Cited

U.S. PATENT DOCUMENTS

| 5,460,340 | A | * | 10/1995 | White ........................ 244/102 A |
| 7,731,124 | B2 | * | 6/2010 | Griffin ....................... 244/102 R |
| 8,376,272 | B2 | * | 2/2013 | Bennett et al. .......... 244/102 SL |
| 8,382,032 | B2 | * | 2/2013 | Bennett et al. ............ 244/102 R |
| 8,398,020 | B2 | * | 3/2013 | Bennett et al. ........... 244/102 SL |
| 2009/0050736 | A1 | * | 2/2009 | Bennett et al. ............ 244/102 R |
| 2010/0116930 | A1 | * | 5/2010 | Griffin ....................... 244/102 A |
| 2010/0257923 | A1 | * | 10/2010 | Bennett ........................ 73/117.03 |
| 2011/0303787 | A1 | * | 12/2011 | Bennett ..................... 244/100 R |
| 2012/0091271 | A1 | * | 4/2012 | Bennett et al. ............ 244/102 R |
| 2012/0112001 | A1 | * | 5/2012 | Bennett et al. .......... 244/102 SS |
| 2012/0119025 | A1 | * | 5/2012 | Bennett et al. ............ 244/102 R |

FOREIGN PATENT DOCUMENTS

| EP | 0 597 689 | 5/1994 |
| EP | 1 749 741 | 2/2007 |

OTHER PUBLICATIONS

International Search Report in PCT/GB2010/050716 mailed Dec. 3, 2010.
International Search Report and Written Opinion in International Application No. PCT/GB2010/050716 dated Dec. 3, 2010.

* cited by examiner

*Primary Examiner* — Christopher P Ellis
*Assistant Examiner* — Medhat Badawi
(74) *Attorney, Agent, or Firm* — Marshall, Gerstein & Borun LLP (57) ABSTRACT An aircraft landing gear assembly includes a bogie beam, a landing gear strut and a stop. The landing gear strut has a first end arranged to be pivotally coupled to an aircraft and a second end pivotally coupled to the bogie beam. The stop is arranged to limit pivotal movement of the bogie beam relative to the landing gear strut The stop includes an elongate member arranged to be deflectable in bending when the bogie beam reaches a pivotal limit.

16 Claims, 10 Drawing Sheets

BOGIE STOP BLOCK

BACKGROUND

A typical arrangement for the main landing gear of medium to large aircraft includes a telescopic shock absorbing landing gear strut pivotally connected to a bogie beam to which a number of axles and wheel pairs are mounted. In normal operation there is sufficient clearance between the bottom of the landing gear strut and the bogie beam to allow the bogie beam to rotate relative to the landing gear strut, for example during take-off and landing manoeuvres and optionally to aid stowage of the landing gear within the aeroplane when the landing gear is retracted.

However, in certain circumstances the bogie beam may be forced to rotate at a higher, than a normal rotation speed which in combination with the inertia of the bogie beam can lead to a greater degree of rotation than normal such that the bogie beam actually strikes the landing gear strut. To prevent damage to either the bogie beam or landing gear strut in the event of such impact between the bogie beam and strut it is known to provide one or more stop pads on the bogie beam such that in the event of over-rotation the stop pad strikes the landing gear strut rather than the bogie beam, thus avoiding any damage to the bogie beam itself. The material from which the stop pad is manufactured is selected so as to ordinarily be capable of withstanding a contact between the stop pad and the landing gear strut with minimal or no damage. Materials that have been used include aluminium and nylon. As the size of the landing gear, and thus in turn the bogie beam, increases the inertia of a rotating bogie beam increases correspondingly, which in turn increases the amount of energy that must be dissipated by the stop pad in the event of over-rotation of bogie beam causing the stop pad to strike the landing gear strut. Impacts between the stop pad and the landing gear strut above a certain energy will cause damage to the stop pad, requiring the stop pad to be replaced, and in more extreme circumstances may cause resulting damage to the bogie beam or landing gear strut themselves. There is clearly a physical limit to the size of stop pad that can be fitted, since the dimensions of the stop pad itself reduces the clearance between the bogie beam and landing gear strut.

There is therefore a problem to be addressed of absorbing the higher energies associated with the over-rotation of larger and heavier bogie beams.

SUMMARY

According to a first aspect of the present invention, there is provided an aircraft landing gear assembly including a bogie beam, a landing gear strut having a first end arranged to be pivotally coupled to an aircraft and a second end pivotally coupled to the bogie beam, and a stop arranged to limit pivotal movement of the bogie beam relative to the landing gear strut, wherein the strut comprises at least one elongate member arranged to be deflectable in bending when the bogie beam reaches a pivotal limit.

By providing an elongate member that bends when the bogie beam is in an over-rotation condition associated energy is dissipated in a controlled manner.

The or each elongate member may be arranged to deform elastically when deflected. In this manner the elongate manner absorbs the energy of the bogie beam without suffering permanent deformation and therefore does not require replacement.

Either additionally or alternatively, the elongate member may be arranged to deform plastically under deflection. The plastic deformation of the elongate member may absorb more energy than if elastic deformation had occurred. The plastic deformation will also provide a visual indication that over-rotation of the bogie beam has occurred.

Additionally, the elongate member is arranged to plastically deform if the deflection exceeds a threshold value. If plastic, permanent deformation only occurs with energies above a certain threshold then replacement of the elongate members would not ordinarily be required but a visual indication of a particularly high-energy over-rotation of the bogie beam is still provided.

In some embodiments of the present invention the stop may further comprise a stop block.

Additionally, the stop block may be located on the bogie beam and arranged to come into contact with the at least one elongate member when the bogie beam approaches the pivotal limit. The provision of a stop lock in addition to the deformable elongate members avoids any contact between the bogie beam itself and the deformable elongate members, thus minimising the opportunity for damage to occur to the bogie beam itself.

Additionally, the stop block may be arranged to slide against the elongate member as the bogie beam pivots further with respect to the landing gear strut. By allowing sliding motion between the stop block and elongate member further energy dissipation can be achieved.

Additionally, the stop block may be profiled to exert either a varying or constant bending force on the elongate member as the stop block slides against the elongate member. In this manner the amount of energy dissipated in deforming the elongate member can be controlled relative to the degree of relative rotation between the bogie beam and landing gear strut.

In certain embodiments the stop may comprise a first stop block located on the bogie beam to a first side of the landing gear strut and a second stop located on the bogie beam to an opposite side of the landing gear strut. In this manner, the previously stated advantages are obtained regardless of direction of rotation of the bogie beam with respect to the landing gear strut.

In further alternative embodiments the stop block may be secured to the or each elongate member and arranged to come into contact with the bogie beam as the bogie beam approaches the pivotal limit. The stop block thus minimises potential damage to the bogie beam that might otherwise occur if the bogie beam itself came into contact with the elongate members.

Additionally, the stop block may be arranged to slide against the bogie beam as the bogie beam pivots further with respect to the landing gear strut. The sliding of the stop block against the bogie beam provides an increased energy absorption capability, as mentioned above.

Furthermore, the stop block may be profiled so as to exert a varying or constant bending force on the elongate member as the stop block slides against the bogie beam. This allows the energy dissipation verses degree of rotation of the bogie beam profile to be controlled.

In addition to any of the previously mentioned embodiments, the or each elongate member may be located on an opposite side of the bogie beam from the landing gear strut. In other words, when the landing gear is fully deployed in preparation for a landing or take-off the elongate member is located on the underside of the bogie beam.

In further embodiments the elongate member may comprise a brake rod pivot pin.

BRIEF DESCRIPTION OF THE DRAWINGS

Embodiments of the present invention will now be described below, by way of illustrative example only, with reference to the accompanying figures, or which.

DETAILED DESCRIPTION

Figure 1:
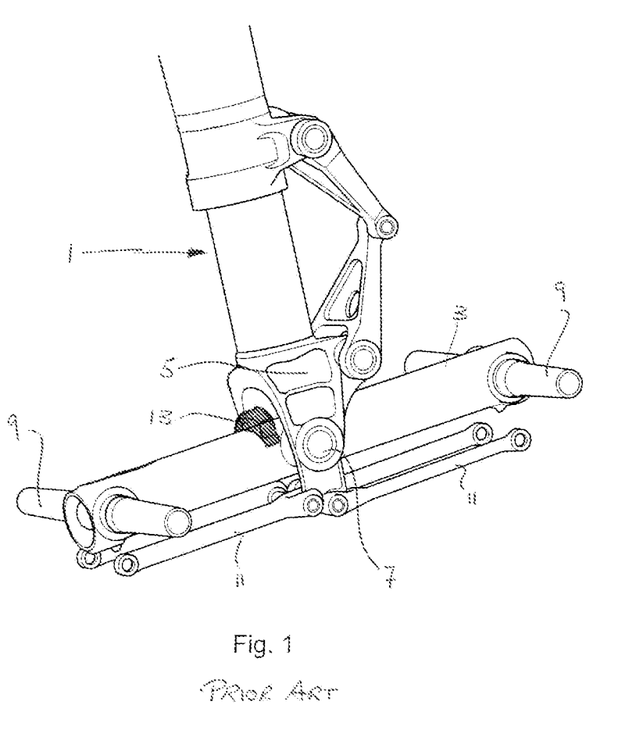
FIG. 1 schematically illustrates a landing gear strut and bogie beam with a stop block according to the prior art.

Referring to FIG. 1, an aircraft landing gear assembly as known in the prior art is schematically illustrated. The landing gear comprises a shock absorber strut 1 that is arranged to be coupled to an aircraft at a first, upper, end and operated to be stowed or deployed in a conventional manner for aircraft landing gear. At the second, lower, end of the shock absorber strut 1 the strut is pivotally coupled to a bogie beam 3. A typical arrangement of the lower end of the shock absorber strut 1 includes a forked yoke 5 extending either side and below the bogie beam 3. A pivot pin 7 pivotally couples the bogie beam three to the yoke 5. The bogie beam generally includes two or more wheel axles 9 to which the actual aircraft wheels are fixed. In addition, it is common practice to also provide one or more elongate brake rods 11 that extend between the lower extremity of the strut yoke 5 and the brake assembly associated with each aircraft wheel (not shown). Each brake rod 11 is pivotally coupled to the strut yoke 5, typically by means of individually pivoting connectors. The function of the brake rods 11 is to transmit the torque applied to the brake assembly during use to the shock strut to prevent any undesired rotation of the brake assembly with respect to the axle 9 or bogie beam 3 during use. The provision of brake rods is the preferred method of preventing this undesired rotation.

Figure 2:
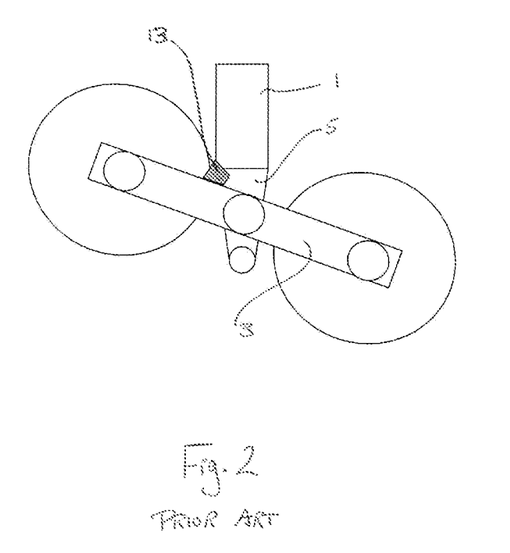
FIG. 2 schematically illustrates the arrangement of the landing gear shown in FIG. 1 when over-rotation of the bogie beam has occurred.

Mounted on an upper surface of the bogie beam 3 is a stop pad 13. Referring to both FIG. 1 and FIG. 2, the stop pad 13 is positioned on the bogie beam 3 such that in the event of over-rotation of the bogie beam, as indicated in FIG. 2, the stop pad comes into contact with the inner surface of the yoke 5 of the shock absorbing strut 1, this preventing the bogie beam 3 itself from striking the yoke. Typical materials from which the stop pad 13 may be made from include aluminium alloys or nylon.

The prior art stop pad arrangements shown in FIGS. 1 and 2 are satisfactory only if the stop pad is sized appropriately to absorb the inertial energy of the bogie beam and aircraft wheels in the event of the bogie beam over-rotating. For larger and heavier landing gear assemblies the energy to be dissipated is correspondingly greater and therefore the size of the stop pads must also increase to avoid being damaged. However, the physical size of the stop pads is limited by the requirement to provide sufficient clearance between the stop pads and shock absorber strut to allow the bogie beam to pivot by the desired amount during normal operations.

Figure 3:
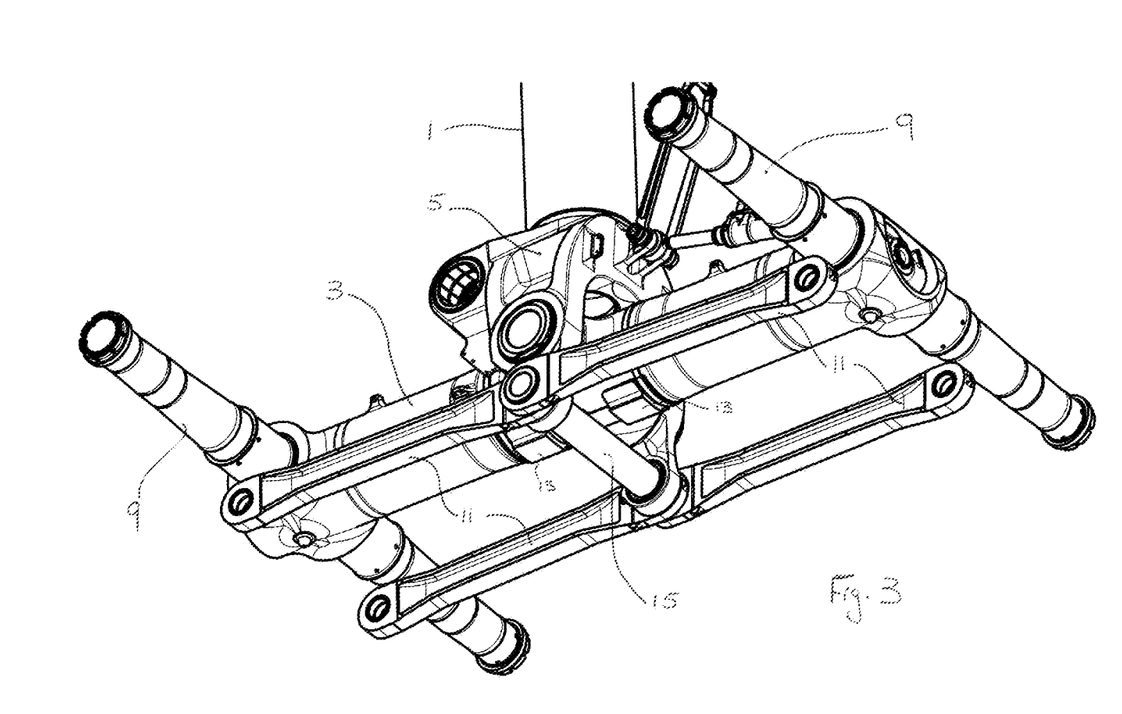
FIG. 3 schematically illustrates a landing gear configuration according to an embodiment of the present invention.

FIG. 3 schematically illustrates a possible landing gear assembly configuration according to an embodiment of the present invention that provides an alternative approach to the stop pads of the prior art. The basic arrangement of a shock absorber strut 1, strut yoke 5, bogie beam 3 and brake rods 11 is the same as that of the prior art and will therefore not be discusses again in detail. Where the landing gear assembly of the embodiment of the present invention shown in FIG. 3 does differ is in the area of the brake rod connection with the shock strut yoke. As can be seen from FIG. 3, the shock strut yoke 5 extends on either side of the bogie beam 3, with each leg of the yoke extending beyond the lower surface of the beam, in an analogous fashion to the prior art arrangement shown in FIGS. 1 and 2. In contrast to the prior art arrangement, an elongate member 15 extends between the yokes legs beneath the bogie beam. Either end of the elongate member 15 may be utilised as part of the pivotal connection of the track rods 11 to the strut yoke 5, as illustrated in the particular arrangement shown in FIG. 3, but this is not essential to embodiments of the present invention. The elongate member 15 may, for example, be a hollow or solid cylindrical metal bar. In the particular arrangement of landing gear according to the embodiment of the present invention shown in FIG. 3, forward and aft stop pads 13 are additionally provided on the under surface of the bogie beam. However, as will be explained further below, their inclusion is optional.

Figure 4:
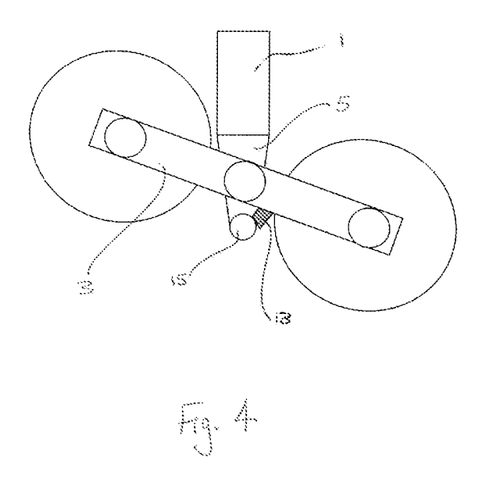
FIGS. 4 & 5 schematically illustrate the aircraft landing gear assembly according to FIG. 3 when over-rotation of the bogie beam has occurred.

FIG. 4 schematically illustrates that landing gear arrangement of FIG. 3 in the event of an over-rotation of the bogie beam 3. It can be seen that the stop pad 13 is in contact with the elongate member 15, the elongate member 15 effectively acting as a stop to limit the pivotal movement of the bogie beam relative to the landing gear strut. In this case the surface of the stop pad is aligned towards the bogie pivot so that there is little or no relative movement between the elongate member and the pad. However, the inclusion of this stop pad 13 is, as previously noted, optional and in embodiments in which the stop pad 13 is not included the bogie beam itself will come into engagement with the elongate member 15, the elongate member alone acting to limit the rotation of the bogie beam. However, the elongate member 15 is not arranged to absorb the entirety of the rotational energy of the bogie beam in an analogous fashion to the stop pads known from the prior art. In contrast, the elongate member 15 is arranged to be deflectable and bending when the bogie beam, or optional stop pad 13, comes into contact with it. The deflection of the elongate member further absorbs the rotational and inertial energy imparted by the rotating bogie beam, thus allowing the elongate member 15 to be smaller, and thus lighter, than would otherwise be the case if no deflection occurred. The elongate member may be arranged to deform elastically when deflected, i.e. to return to the non-deflected condition when not in contact with the bogie beam. Alternatively, the elongate member may be arranged to deform plastically under deformation, i.e. to undergo permanent deformation. Permanent deformation of the elongate member 15 is likely to allow a greater magnitude of energy to be absorbed by the elongate member and to also provide a visual indication that an over-rotation of the bogie beam has occurred, but as it is advantaged at the elongate member 15 would require replacement after it had undergone deformation. In some embodiments of the present invention an elongate member 15 may be arranged to initially undergo elastic deformation up to a threshold value of deflection, and thereafter to undergo plastic deformation. This would allow over-rotations below the threshold energy value to occur without requiring replacement of the elongate member, but would also allow higher energy value over-rotations to be successfully managed when they occur.

Figure 5:
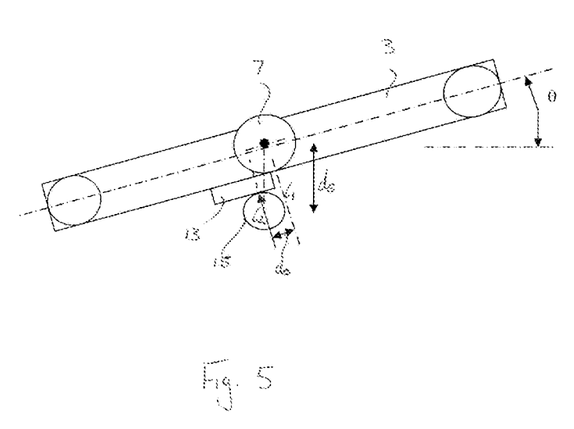

FIG. 5 schematically illustrates the geometric relationships between the bogie beam 3 and elongate element 15, with only the bogie beam 3, pivot pin 7, optional stop pad 13 and elongate member 15 being shown in FIG. 5 for the sake of clarity. The bogie beam 3 is illustrated in a position of over-rotation in which the bogie beam is at a nominal angle θ with respect to its normal, perpendicular orientation with respect to the shock absorber strut. The central pivot axis of the bogie beam and the central axis of the elongate member 15 are separated from one another by a distance ds which will be dictated by a combination of the dimensions of the shock strut of the yoke 5 and the relative positioning of the bogie beam pivot point and elongate member attachment point to the shock strut yoke. A virtual line, labelled 11 in FIG. 5 can be imaged extending perpendicularly from the longitudinal axis of the bogie beam from the pivot point of the bogie beam and yoke. A similar imaginary line, labelled 12 in FIG. 5 can be imaged passing through the central axis of the elongate member 15 perpendicular to the longitudinal axis of bogie beam. When the bogie beam is at an angle θ then there is a separation do offset, between these two imaginary lines, as illustrated in FIG. 5 (when θ is 0, i.e. the bogie beam is perpendicular to the longitudinal axis of the shock absorber strut, the two imaginary lines coincide and the separation do=0). Because of the existence of this offset do any portion of the bogie beam 3, or other element attached to the bogie beam such as stop pad 13, located either side of the pivot axis of the bogie beam and strut yoke will move in an arc relative to the elongate member 15 as the bogie beam rotates and will therefore have a component of horizontal movement relative to the elongate member 15. In the event of over-rotation of the bogie beam the component of horizontal movement of the bogie beam, and stop pad 13 where fitted, relative to the elongate member 15 will continue as the elongate member 15 undergoes the arranged for deformation, since the deformation of the elongate member in turn allows continued rotation of the bogie beam. There will therefore be some horizontal movement of the bogie beam or stop pad relative to the elongate member whilst the bogie beam or stop pad in contact with the elongate member, i.e. there will be some sliding contact. Consequently, a further energy conveyed by the rotating bogie beam can be dissipated in the deformation phase of the elongate member as the energy required to overcome the friction between the elongate member and bogie beam or stop pad. The coefficient friction between the elongate member and bogie beam or stop pad can be controlled by selection of the materials from which the elongate member, bogie beam and stop pad are manufactured or with which they are coated.

Figure 6:
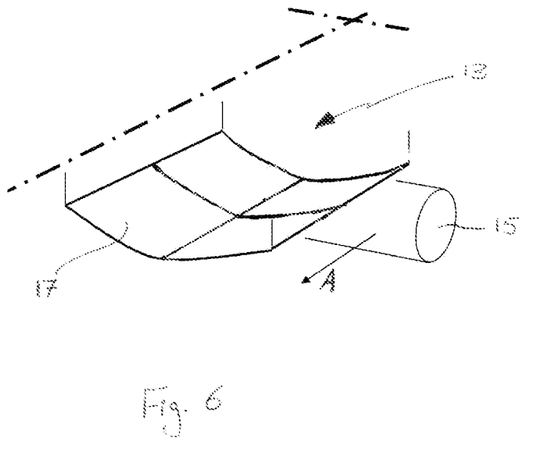
FIGS. 6, 6a & 6b schematically illustrate a profiled stop pad in accordance with further embodiments of the present invention.
Figure 6A:
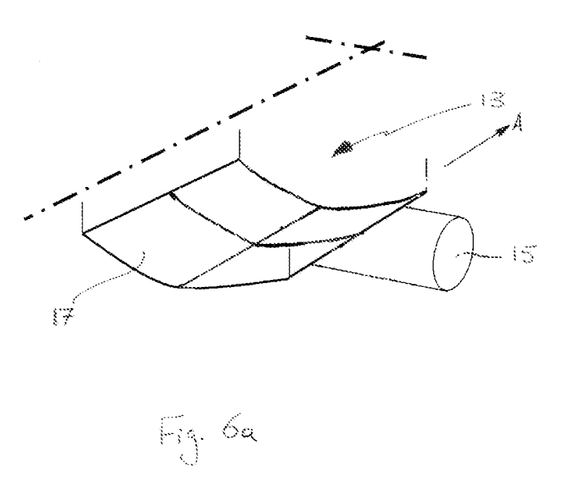

The bending of the elongate member 15 by the bogie beam or stop pad can be further controlled by varying the profile of the stop pad or section of bogie beam that is in sliding contact with the elongate member 15. An example of this according to an embodiment of the present invention is schematically illustrated in FIG. 6a, in which the under surface 17 of a stop pad 13 is shown in relation to an elongate member 15. The remainder of the stop pad is not illustrated for purposes of clarity. In FIG. 6, the stop pad 13 is shown in the position when the stop pad 13 first comes into contact with the elongate member 15. The lower surface 17 of the stop pad 13 is curved in a convex manner. The result of this curvature is that when the stop pad 13 first comes into contact with the elongate member 15 there is only a small contact area at the centre of the stop pad 13 and consequently a relatively high bending moment (bending moment=load×moment arm) compared with the applied load (i.e. a large moment arm) to increase the rate of energy absorption. However, as rotation of the bogie beam increases and the stop pad moves horizontally in the direction of arrow A then so does the elongate member 15 begin to bend. As elongate member 15 bends a greater portion of the elongate member comes into contact with the curved lower surface 17 of the stop pad 13 as the elongate member 15 begins to conform to the curvature of the stop pad. Consequently, the moment arm is reduced, and the maximum bending stress in the elongate member is limited.

Figure 6B:
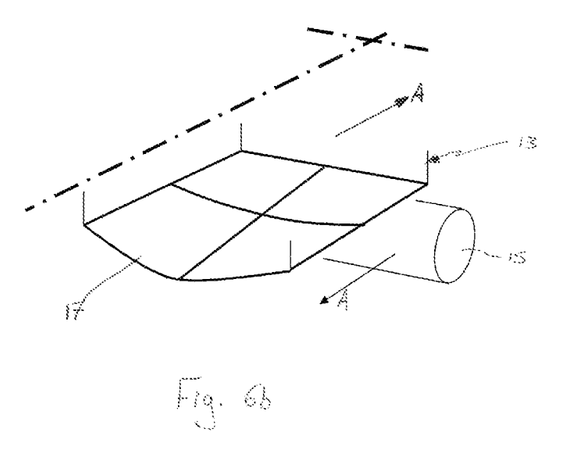

A further example of a profiled stop pad is illustrated in FIG. 6b. As in FIG. 6a the stop pad 13 is shown in the position when the stop pad 13 first comes into contact with the elongate member 15. However, in this example the curvature of the lower surface 17 of the stop pad 13 varies from no curvature at the point of initial contact to a convex curvature at the opposite end of the stop pad. In fact the change of curvature of the stop pad lower surface 17 is such that it matches the extent of bending of the elongate element 15 as the stop pad moves horizontally in the direction of arrow A as the bogie beam rotates, i.e. the lower surface of the stop pad and the elongate member conform to one another over the full range of relative horizontal movement. Consequently the bending moment arm applied to the elongate member by the stop pad remains constant. It will be therefore appreciated that the bending moment applied to the elongate member can be varied as desired by appropriately profiling the lower surface of the stop pad.

Figure 7:
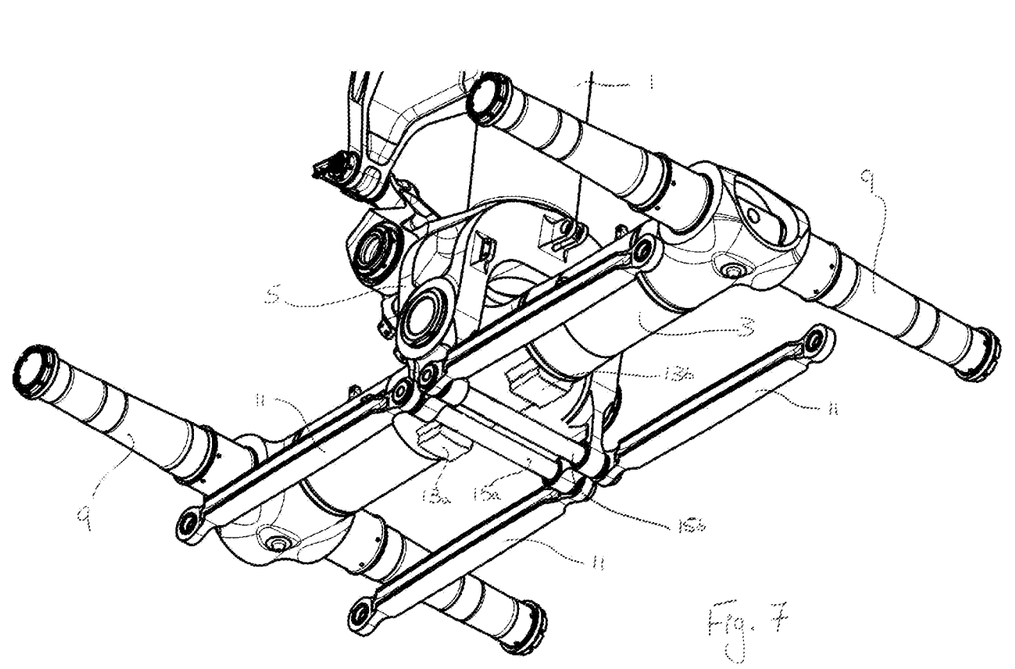
FIG. 7 schematically illustrates further configuration of an aircraft landing gear according to an embodiment of the present invention.

A further embodiment of the present invention is illustrated in FIG. 7. In this further embodiment the single elongate member 15 of the previously illustrated embodiments is replaced by two separate elongate members 15a, 15b. In the particular embodiment illustrated in FIG. 7 two separate corresponding stop pads 13a, 13b are also provided on the underside of the bogie beam 3, although it will be appreciated that it as previously explained the stop pads are preferred but not essential integers of the present invention. In the arrangement illustrated each individual elongate member 15a, 15b only comes into contact with the bogie beam or stop pads 13a, 13b for a particular direction for rotation of the bogie beam 3 relative to the shock absorber strut 1. This allows enhanced absorption of the rotation energy of the bogie beam irrespective of the direction of rotation and in particular to take into account differences in rotational energy of the bogie beam that may occur due to any asymmetrical aspects of the landing gear assembly.

Figure 8:
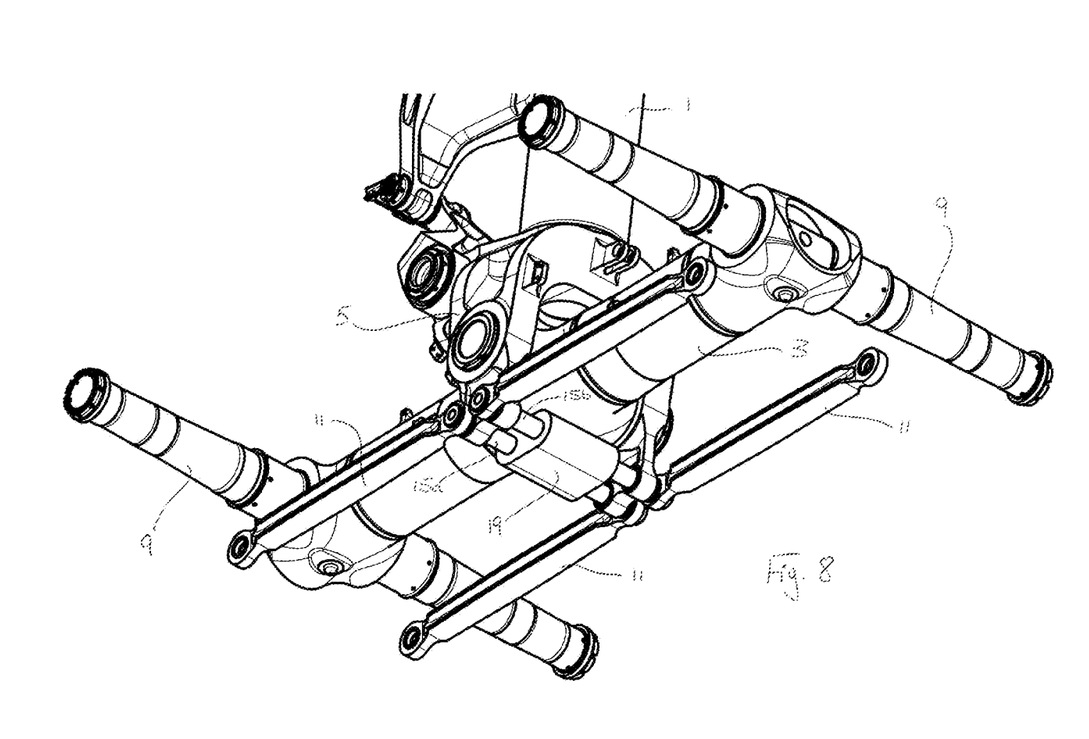
FIG. 8 schematically illustrates a further configuration of an aircraft landing gear assembly according to another embodiment of the present invention.

FIG. 8 discloses a further embodiment of the present invention in which, similar to the embodiment shown in FIG. 7, two separate elongate amendments 15a, 15b are provided. However, in contrast to the previously illustrated embodiments a stop pad 19 is mounted on the two engagement members 15a, 15b. Mounting the stop pad 19 on the elongate member provides an alternative to mounting stop pads on the bogie beam. This has the advantage of reducing the mass of the bogie beam and associated assemblies and therefore reducing the inertial energy to be absorbed in the event of over-rotation of the bogie beam. This in turn allows the elongate members 15 to have a lower energy-absorbing requirement which will lead to them being lighter and/or smaller. A further advantage of mounting the stop pad 19 to the elongate members 15a, 15b is that both elongate members will be subject to a deflection force regardless of the direction of over-rotation of the bogie beam, since the force is transmitted via the stop pad 19. This may allow the individual elongate members to be correspondingly reduced in size and weight. A further advantage of this arrangement is that it may simply be easier to amount the stop pad 19 on the elongate members. It will of course be appreciated that in those embodiments of the present invention in which only a single elongate member is provided a stop pad 19 may still be mounted to the single elongate member in an analogous fashion to that shown in FIG. 8 to provide analogous advantages to those stated above.

By providing an aircraft landing gear assembly including an elongate member arranged to be deflectable in bending as previously described, the present invention provides a solution to the problem of absorbing a large energies during over-rotation of the bogie beam whilst avoiding the problems identified with simply using larger stop pads location on the upper surface of the bogie beam. Additionally, the provision of the elongate members that are arranged to deflect in bending allows the energy of the bogie beam to be dissipated in a more controlled manner, thus further reducing a possibility of damage being caused to other components of the landing gear assembly through sudden shock loadings.

The invention claimed is:

1. An aircraft landing gear assembly comprising:
   a bogie beam;
   a landing gear strut having a first end arranged to be pivotally coupled to an aircraft and a second end pivotally coupled to the bogie beam; and
   a stop arranged to limit pivotal movement of the bogie beam relative to the landing gear strut,
   wherein the stop comprises an one elongate member arranged to be deflectable in bending when the bogie beam reaches a pivotal limit.

2. A aircraft landing gear assembly according to claim 1, wherein the elongate member is arranged to deform elastically when deflected.

3. An aircraft landing gear assembly according to claim 1, wherein the elongate member is arranged to deform plastically under deflection.

4. An aircraft landing gear assembly according to claim 3, wherein the elongate member is arranged to plastically deform if the deflection exceeds a threshold value.

5. An aircraft landing gear assembly according to claim 1, wherein the stop further comprises a stop block.

6. An aircraft landing gear assembly according to claim 5, wherein the stop block is located on the bogie beam and arranged to come into contact with the elongate member when the bogie beam approaches the pivotal limit.

7. An aircraft landing gear assembly according to claim 6, wherein the stop block is arranged to slide against the elongate member as the bogie beam pivots with respect to the landing gear strut.

8. An aircraft landing gear assembly according to claim 7, wherein the stop block is profiled so as to vary the bending moment on the elongate member as the stop block slides against the elongate member.

9. An aircraft landing gear assembly according to claim 7, wherein the stop block is profiled so as to exert a constant bending moment on the elongate member as the stop block slides against the elongate member.

10. An aircraft landing gear assembly according to claim 5, wherein the stop comprises a first stop block located on the bogie beam to a first side of the landing gear strut and a second stop block located on the bogie beam to an opposite side of the landing gear strut.

11. An aircraft landing gear assembly according to claim 5, wherein the stop block is secured to the elongate member and arranged to come into contact with the bogie beam as the bogie beam approaches the pivotal limit.

12. An aircraft landing gear assembly according to claim 11, wherein the stop block is arranged to slide against the bogie beam as the bogie beam pivots further with respect to the landing gear strut.

13. An aircraft landing gear assembly according to claim 12, wherein the stop block is profiled so as to exert a varying bending moment on the elongate member as the stop block slides against the bogie beam.

14. An aircraft landing gear assembly according to claim 12, wherein the stop block is profiled so as to exert a constant bending moment on the elongate member as the stop block slides against the bogie beam.

15. An aircraft landing gear assembly according to claim 1, wherein the elongate member is located on an opposite side of the bogie beam from the landing gear strut.

16. An aircraft landing gear assembly according to claim 1, wherein the elongate member comprises a brake rod pivot pin.

* * * * *